US009456204B2

(12) United States Patent
Arling et al.

(10) Patent No.: US 9,456,204 B2
(45) Date of Patent: Sep. 27, 2016

(54) SYSTEM AND METHOD FOR FACILITATING CONFIGURATION OF A CONTROLLING DEVICE VIA A 3D SYNC SIGNAL

(75) Inventors: Paul D. Arling, Irvine, CA (US); Graham Williams, Corona Del Mar, CA (US); Jeremy K. Black, N. Tustin, CA (US)

(73) Assignee: Universal Electronics Inc., Cypress, CA (US)

( * ) Notice: Subject to any disclaimer, the term of this patent is extended or adjusted under 35 U.S.C. 154(b) by 1403 days.

(21) Appl. No.: 12/959,967

(22) Filed: Dec. 3, 2010

(65) Prior Publication Data

US 2011/0228046 A1 Sep. 22, 2011

Related U.S. Application Data

(63) Continuation-in-part of application No. 12/724,820, filed on Mar. 16, 2010.

(51) Int. Cl.
*H04N 13/00* (2006.01)
*H04N 15/00* (2006.01)
*H04N 13/04* (2006.01)

(52) U.S. Cl.
CPC ...... *H04N 13/0438* (2013.01); *H04N 13/0497* (2013.01); *H04N 2213/008* (2013.01)

(58) Field of Classification Search
USPC ..................................... 348/42–61
See application file for complete search history.

(56) References Cited

U.S. PATENT DOCUMENTS 6,057,811 A   5/2000 Edwards
8,712,946 B1*  4/2014 Heidenreich ............ G06N 5/04
                                                            706/45
2004/0130566 A1*  7/2004 Banerjee et al. ............. 345/716
2006/0132382 A1*  6/2006 Jannard ............................ 345/8
2007/0153122 A1   7/2007 Ayite et al.

(Continued)

FOREIGN PATENT DOCUMENTS

EP   2442580 A2   4/2012
WO   97/43681 A1  11/1997

OTHER PUBLICATIONS

The International Bureau of WIPO, International Preliminary Report on Patentability of PCT application No. US2011/028585, date of issuance of report Sep. 18, 2012, 7 pgs.
European Patent Office, extended European Search Report issued on European patent application No. 11756707.3 dated Aug. 27, 2013, 6 pages.

(Continued)

*Primary Examiner* — Frederick Bailey
*Assistant Examiner* — Talha M Nawaz
(74) *Attorney, Agent, or Firm* — Greenberg Traurig, LLP (57) ABSTRACT

A controlling device is configures to control functional operations of an appliance by using a 3D sync signal transmitted to synchronize a wearable 3D viewing apparatus with a device adapted to render 3D media to select from a library of command codes a command code set appropriate for controlling functional operations of the appliance. The command codes within the command code set selected from the library of command codes are assigned to respective keys of the controlling device whereupon a subsequent activation of one or more of the respective keys of the controlling device will cause the controlling device to issue a command transmission via use of one or more of the command codes within the command code set selected from the library of command codes to thereby control one or more functional operations of the appliance.

24 Claims, 6 Drawing Sheets

(56) References Cited

U.S. PATENT DOCUMENTS

2008/0012850 A1\* 1/2008 Keating, III ................. 345/419
2010/0007582 A1\* 1/2010 Zalewski ........................ 345/8
2010/0053310 A1 3/2010 Maxson et al.
2011/0279644 A1\* 11/2011 Suh et al. ...................... 348/43
2012/0062562 A1 3/2012 Chen et al.
2012/0147141 A1\* 6/2012 Sasaki et al. .................. 348/43

OTHER PUBLICATIONS

European Patent Office, extended European Search Report issued on European patent application No. 11756891.5 received on Jul. 24, 2013, 7 pages.

European Patent Office, Examination Report issued on European patent application No. 11756891.5, dated Jun. 3, 2015, 4 pages.

\* cited by examiner

SYSTEM AND METHOD FOR FACILITATING CONFIGURATION OF A CONTROLLING DEVICE VIA A 3D SYNC SIGNAL

RELATED APPLICATION DATA

This application claims the benefit of and is a continuation-in-part of U.S. application Ser. No. 12/724,820 filed Mar. 16, 2010.

BACKGROUND

Various 3D television content and rendering devices are presently entering the consumer electronics market. Several technologies are available which produce viewer sensation of a 3D image, including anaglyphic based 3D utilizing glasses with two different color lenses (for example red and cyan); polarization based 3D utilizing glasses with lenses polarized in different directions (for example horizontal and vertical polarization); and alternate-frame sequencing based 3D utilizing glasses or headgear equipped with active-shutters which operate in synchronization with alternating picture frames. Autostereoscopic based displays which do not require any glasses or headgear (for example producing a 3D effect through the use of a Lenticular lens in the display device) have also been proposed, although at the current state of technology development these are generally effective only over a limited number of "sweet spot" viewer positions and/or for small display sizes.

Of the current technologies, many manufacturers of 3D TV rendering devices are opting for alternate-frame sequencing based 3D technology which utilizes active-shutter glasses. The shutter mechanism of the glasses may be electronic, for example using a transmissive LCD material, or may be mechanical. Shutter synchronization with the frames displayed by a 3D TV rendering device may be accomplished through a wired connection or wirelessly via an infrared or RF signal transmitted by the rendering device, playback device, or an external adapter supplied in conjunction with the active-shutter glasses; with the wireless signal generally preferred for user convenience.

In current implementations of the alternate-frame sequencing based 3D approach, many equipment manufacturers have developed proprietary signaling schemes, shutter timings, frame rates, and/or data formats for the synchronization signal transmitted to the active-shutter glasses (collectively referred to hereinafter as "signal format"). Accordingly, active-shutter glasses supplied with alternate-frame sequencing based 3D equipment of one manufacturer may not be compatible with, i.e., usable with, alternate-frame sequencing based 3D equipment of other manufactures. Because functional active-shutter glasses are a prerequisite for viewing alternate-frame sequencing based 3D content and because active-shutter glasses may be a relatively expensive accessory required for every individual viewer, this lack of compatibility may be perceived by consumers as a drawback.

SUMMARY OF THE INVENTION

This invention relates generally to 3D viewing systems and, more particularly, to operation and configuration of an active viewing device intended to be interposed between a viewer and plural different display rendering devices to provide a means for universally synchronizing the active viewing device with alternate-frame sequencing based 3D encoded material presented on each of the plural different display rendering devices. To this end, the active viewing device, e.g., a pair of universal active-shutter 3D viewing glasses, includes a microcontroller programmed to receive and decode the wireless shutter synchronization signals of multiple manufacturers to thereby enable use of the active viewing device with multiple, different displaying rendering devices presenting alternate-frame sequencing based 3D content. The signal format currently in use in conjunction with a display rendering device may be automatically detected by the programming of the microcontroller of the active viewing device, may be selected by the user via an input means associated with the active viewing device (such as, for example, a miniature rotary switch), may be externally selected on a PC or set top box and downloaded or transmitted to the active viewing device, etc., as appropriate for a particular embodiment. Additionally, in some embodiments, the active viewing device may incorporate convenience features such as configurable remote control functionality, earphones, etc.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
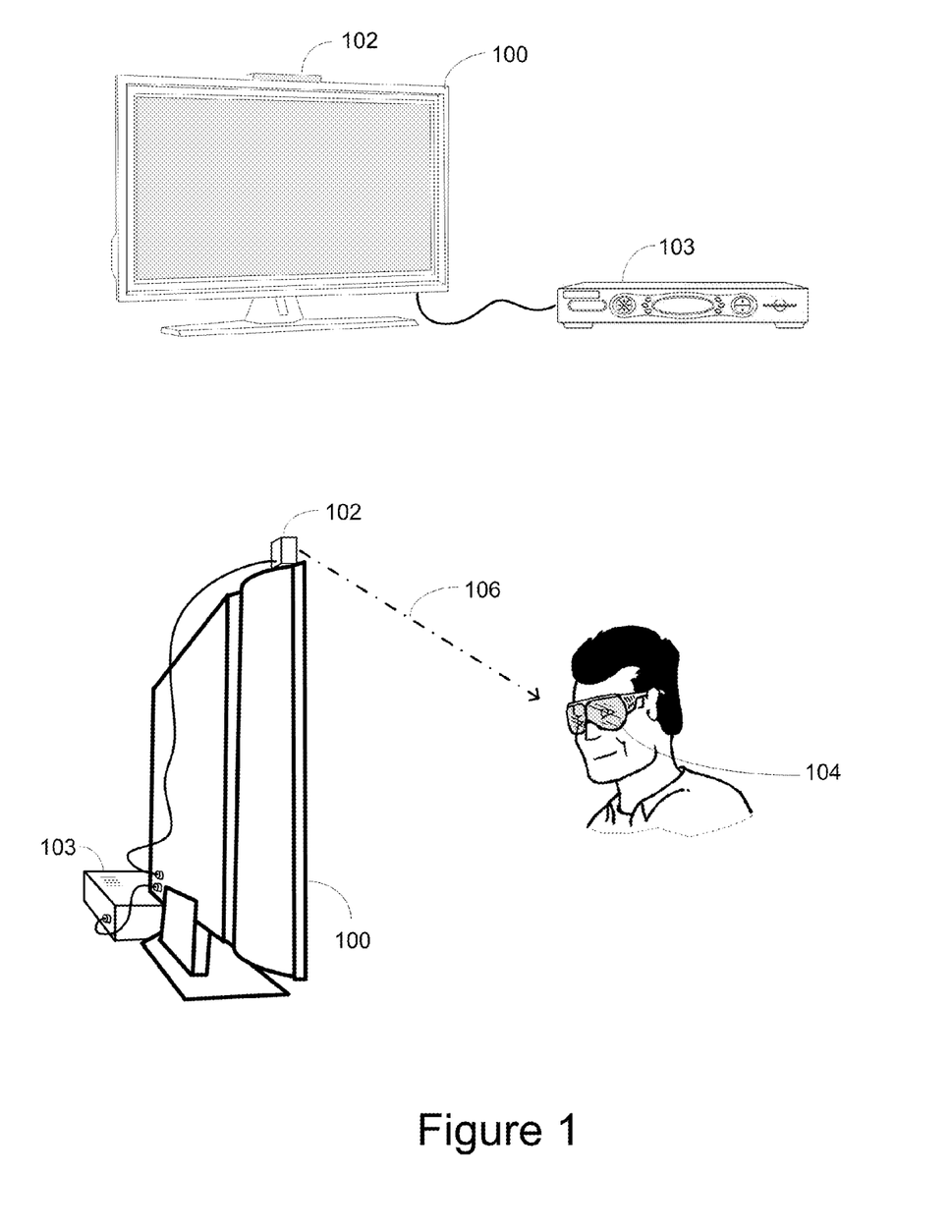
FIG. 1 illustrates an exemplary system equipped for 3D viewing.

With reference to FIG. 1, an exemplary TV set 100 suitable for rendering alternate-frame sequencing based 3D material may include a transmitter 102 for the propagation of synchronization signals 106 to active viewing devices such as exemplary active-shutter glasses 104. It will be appreciated that the source of the synchronization timing information to be conveyed to active-shutter glasses 104 may be TV set 100 or may be some other unit such as a set top box 103, DVD player, etc., and that wireless transmitter 102 may comprise a separate external unit as illustrated or may be incorporated into TV set 100 or other source unit, as appropriate for a particular embodiment. The synchronization signals may be transmitted using IR, RF, ultrasonic, or any other convenient means and may use any signal format recognizable by exemplary glasses 104.

Figure 2:
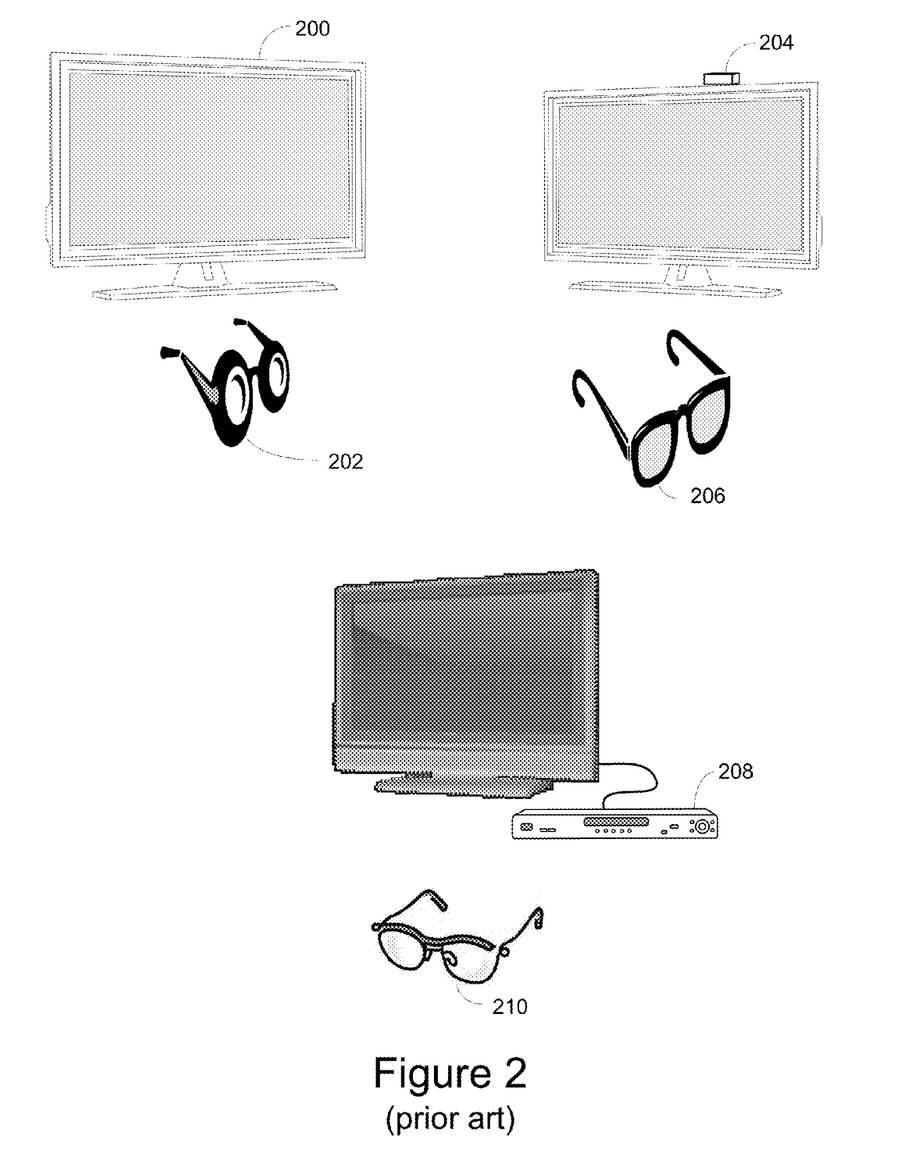
FIG. 2 illustrates various prior art items of 3D viewing apparatus.

Turning now to FIG. 2, in accordance with current art, manufacturer 200 may supply an active viewing device 202 that is only compatible with, i.e., only recognizes, manufacturer 200's signal format; manufacturer 204 may supply active viewing device 206 that is only compatible with, i.e., only recognizes, manufacturer 204's signal format; manufacturer 208 may supply active viewing device 210 that is only compatible with, i.e., only recognizes, manufacturer 208's signal format; and so on. Such active viewing device incompatibility between rendering devices of different manufacture may constitute a disincentive to consumer satisfaction with and/or adoption of the technology.

Figure 3:
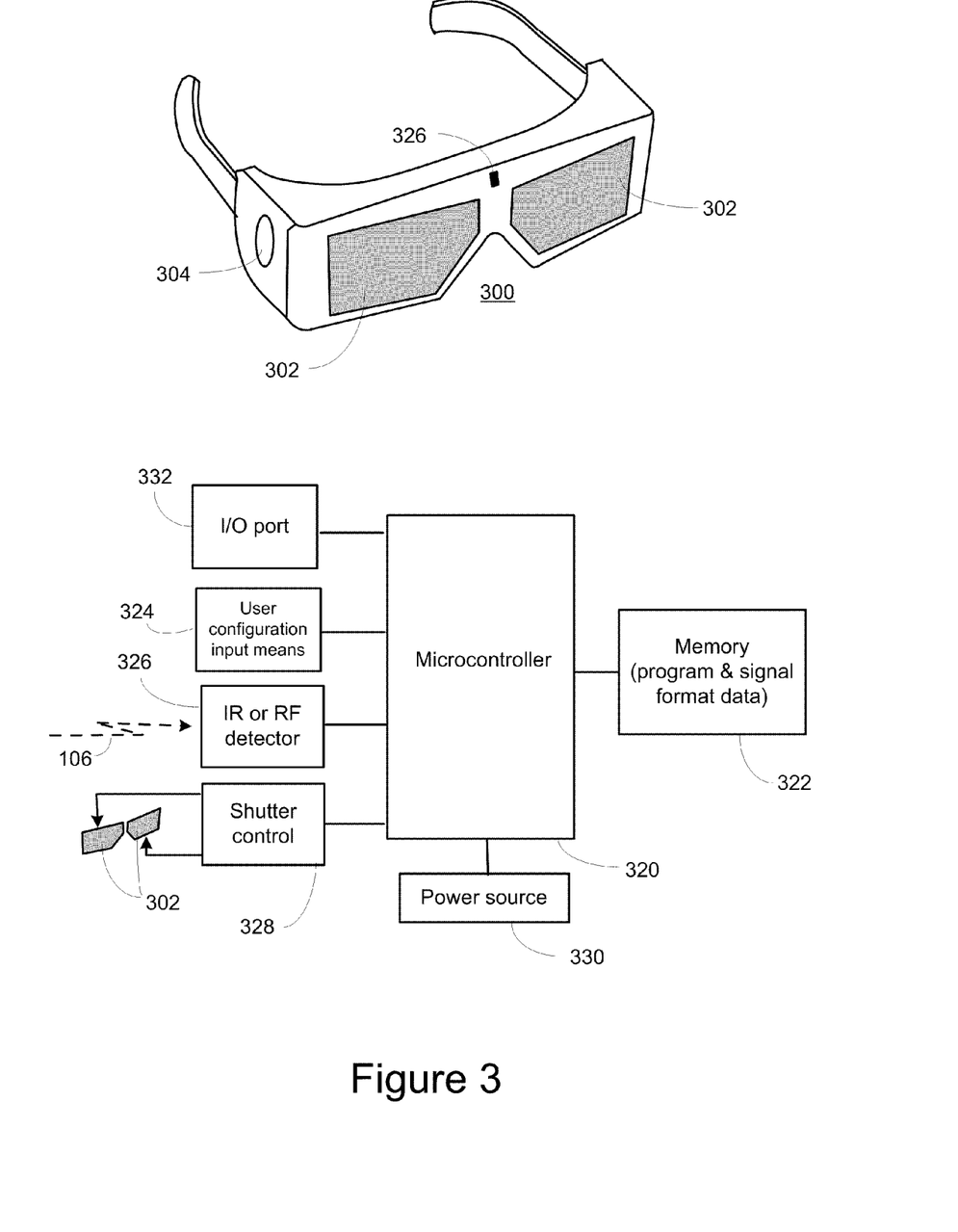
FIG. 3 illustrates an exemplary universal active-shutter 3D viewing apparatus in accordance with this invention.

FIG. 3 illustrates an exemplary universal, active viewing device 300 in accordance with the instant invention. Exemplary universal, active viewing device 300 is in the form of active-shutter glasses 300 which may incorporate a pair of LCD-based active-shutter lenses 302 together with associated control circuitry 328 coupled to an on-board microcontroller 320. Microcontroller 320 may also be coupled to or incorporate a memory 322 which may comprise RAM, ROM, FLASH or any combination thereof; user input means 324, which may comprise a miniature key matrix, miniature rotary switch, DIP switch, pushbutton, etc. as appropriate; receiver and/or transceiver circuit(s) 326 (e.g., IR and/or RF); an input/output port 332 such as a serial interface, USB port, modem, Zigbee, WiFi, or Bluetooth transceiver, etc.; and a power source 330 which may also power peripheral circuitry such as the active-shutter control 328, an IR or RF receiver 326, etc. All or some of these components may be utilized within the active viewing device 300 as needed.

As will be understood by those skilled in the art, portions of the memory 322 may include instructions that are intended to be executed by the processor 300 to control the operation of the active viewing device 300 (hereafter the operational software), as well as data which serves to define to the operational software the necessary signal formats for use in decoding synchronization signals received from a signal transmitter 102 (hereinafter the "signal format definition data"). In this manner, the processor 320 may be programmed to control the various electronic components within the universal viewing device 300, e.g., to monitor receiver 326, to decode synchronization signals received from a signal transmitter 102 and for providing the decoded synchronization signals to active-shutter control circuit 328, to monitor the user interface device 324 as appropriate to receive user set up commands or other input, etc.

Selection by the operational software of the signal format definition data to be used in decoding synchronization signals received from a transmitter 102 may be automatic, for example, by analyzing the characteristics of a received synchronization signal and comparing these to various items of signal format definition data stored in memory 322 to thereby select a matching signal format definition data for use in the aforementioned decoding process. Such characteristics may comprise, without limitation, carrier and/or modulation frequency, pulse width or timing, data encoding, packet size, repetition rate, etc. Alternatively, the received synchronization signal may contain data that otherwise explicitly informs the universal viewing device 300 of a signal format definition data to be used in the aforementioned decoding process. Such data may be provided to the universal viewing device 300 in the form of a separate initialization transmission; a header, preamble, or trailer affixed to each transmission, etc. Such explicit identification data may be an integral part of the synchronization signal or may be added to the synchronization signal, appended to the synchronization signal, or separately issued by an externally provisioned or add-on transmitter unit.

In embodiments where automatic identification of a signal format is not possible or not desirable, user-initiated configuration of the universal viewing device 300 may be provided, for example by entering configuration settings using a user input device 324, located for example inside a battery compartment 304 of the universal viewing device 300. In this regard, the configuration settings to be entered via a user configuration input device 324, e.g., dip switch arrangements, dial settings, etc, may be provided to a user in a user's manual that includes various configuration settings cross-referenced to various device manufacturers. Alternatively, a setup application may be provided for execution on an external device, for example, a PC, set top box or other appliance, etc., which application allows a user to enter or select from a menu information, e.g., manufacturer of TV 100, which serves to identify the signal format definition data to be used. Once identified, the identity of the signal format definition data to be used may be conveyed to universal viewing device 300 via IR or RF receiver 326 using either the standard synchronization signal transmitter 102 or a separate transmitter provided for use with the setup application; via a separate I/O port 332; via a USB transfer device, or any other convenient means. In embodiments of universal viewing device 300 which include a rechargeable battery and docking station, it will be appreciated that a connection to I/O port 332 may be built into such docking station for transferring information used to configure the universal viewing device 300 for compatible operation with a synchronization signal. It will also be appreciated that, rather than identify a signal format definition data within a library of signal format definition data stored in memory to be used, the system may provide for the conveyance of a signal format definition data itself to the universal viewing device 300 for use in the aforementioned decoding process. Alternative universal viewing device 300 setup procedures are also contemplated, for example scanning a bar code or reading an RFID tag associated with a rendering device.

Regardless of the configuration process used, in some embodiments an I/O port 332 may be provided for the purpose of updating the library of signal format definition data stored in memory 322, for example, when a new rendering device using a heretofore unknown synchronization signal format enters the market.

Figure 4:
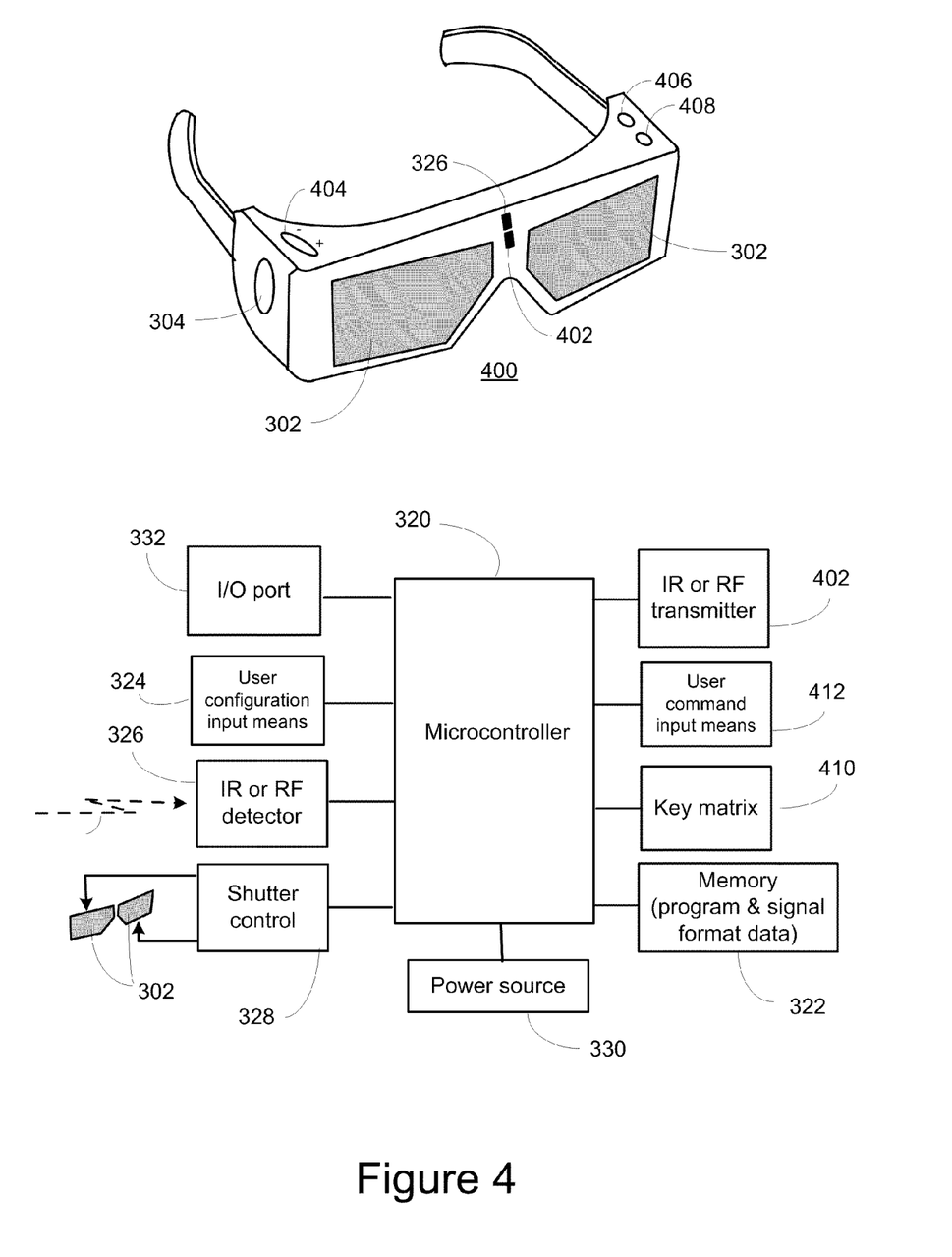
FIG. 4 illustrates a further exemplary universal active-shutter 3D viewing apparatus in accordance with this invention.

In certain embodiments, the universal viewing device 300 may include additional user convenience features. For example, as illustrated in FIG. 4, a universal viewing device 400 may include a library of infrared and/or RF appliance control codes and/or data in the contents of memory 322 together with the appropriate IR and/or RF transmitter or transceiver means 402 and one or more user command inputs 410 such as keys, buttons, or sensors coupled to microcontroller 320. As is well known in the art (see, for example, U.S. Pat. Nos. 4,959,810 and 5,872,563, which patents are incorporated herein by reference in their entirety), such a library of codes and/or data may be used to command operational functions of various appliances. In such embodiments, a element 412 such as an LED, piezoelectric beeper, etc. may also be provided to offer user feedback during set up or operation of the device 400.

The selection of a particular IR or RF code set to be used may be inferred based upon the selected synchronization signal format, or may be separately configured using any of the methods presented previously or hereafter. The IR and/or RF codes and/or data may also be upgraded or updated via I/O port 330 as described for signal format definition data, or may be upgraded or updated via the IR and/or RF transceiver means for the purpose of updating the library of infrared and/or RF appliance control codes and/or data stored in memory 322, for example, when a new appliance is introduced into the users entertainment setup. This IR/RF transmitter subsystem may provide basic appliance control functionality, e.g. volume control 404, mute 406, and power 408, or play/pause control (not illustrated) to every wearer of a universal viewing device 400 so equipped. Other functionality offered may include automatic actions such as, for example, automatically pausing content playback, automatically causing the rendering device to switch to a 2D presentation mode, etc. when universal viewing device 400 is removed from a viewer's face (which removal may be sensed using any form of proximity sensor provided to the universal viewing device 400).

Figure 5:
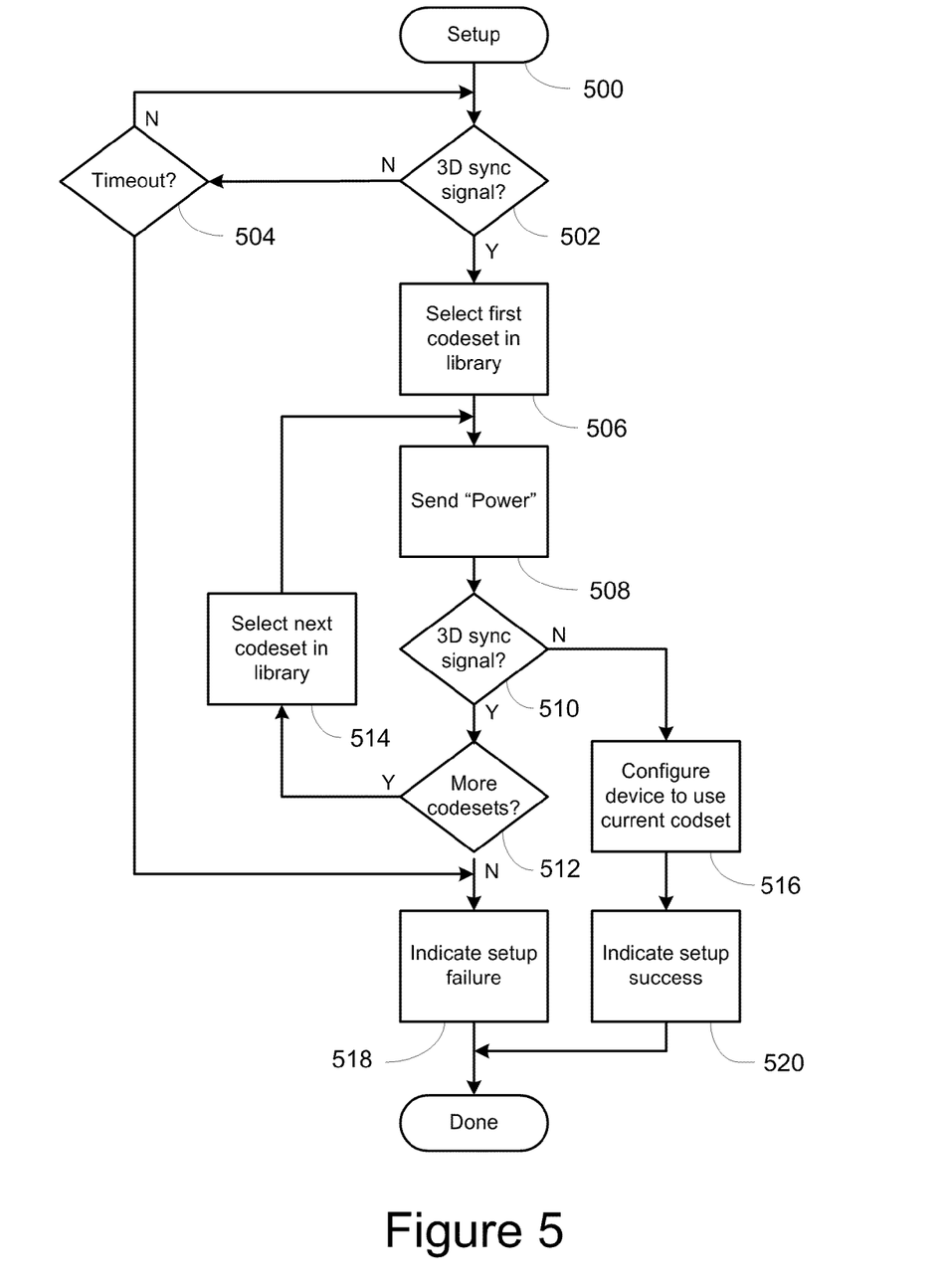
FIG. 5 illustrates in flow chart form a method for configuring the exemplary viewing apparatus of FIG. 4 to communicate command functions to an appliance.

In certain embodiments, selection of a particular IR or RF code set to be used for appliance control of, for example TV 100, may be advantageously performed by monitoring the 3D sync signal output by that appliance, as will now be described in conjunction with the flowchart of FIG. 5.

Upon initially being placed into setup mode 500, for example by a user simultaneously activating "power" and "mute" keys 406,408 for a predetermined period of time (or by such other method as may be appropriate for a given embodiment) at steps 502, 504 the operating software of universal viewing device 400 may initially monitor 3D sync receiver 326 to verify that a 3D sync signal is currently being transmitted from TV 100 (or another appliance). In this regard, it will be appreciated that the user may have been advised, for example via a user manual, screen display, customer service line, FAQ list, etc., to ensure that 3D content is currently being provided to TV 100 for rendering prior to initiating the setup process. If no 3D sync signal is detected, after an appropriate timeout period the operating software of universal viewing device 400 may at step 518 activate user feedback means 412 to indicate setup failure, e.g., via a distinctive LED blink pattern, sound, etc., and thereafter exit setup mode with the configuration of device 400 unchanged.

Once presence of a 3D sync signal has been verified, at step 506 the operating software of universal viewing device 400 may select a first appliance control code set from the library of such code sets stored in memory 322 and at step 508 cause the "power" function of that code set to be output via command transmitter 402. In this regard it will be appreciated that the power function that is output may comprise a "power off" or a "power toggle" command as appropriate for the particular appliance code set being tested, and also that in other embodiments any alternate command function which results in an observable effect on the 3D sync signal may be substituted and output if desired. After output of the "power" function, at step 510 the operating software of universal viewing device 400 may monitor 3D sync receiver 326 to ascertain if the 3D sync signal of TV 100 is still present. If so, at steps 512 and 514 the operating software of universal viewing device 400 may, provided there are remaining code sets to be tested, select the next appliance control code set from the library of code sets stored in memory 322 and repeat step 508 et seq.

If at step 510 it is however determined that the 3D sync signal is no longer present, i.e., TV 100 has responded to the just-issued "power" command, the operating software of universal viewing device 400 may configure device 400 to use the currently selected appliance code set when issuing future appliance commands, e.g., in response to user activation of key matrix 410, when issuing automatic commands in response to actions such as removal of viewing device 400 from a viewer's face, etc. Thereafter, at step 520 a successful conclusion of the setup process may be signaled to the user, once again by activating user feedback means 412 to produce a distinctive LED blink pattern, sound, etc., after which the set up process is complete.

It will be appreciated that other applications of this technique are also possible, for example the 3D sync output signal of TV 100 may be dependent upon a media source, e.g., STB 103, DVD player, etc., such that powering down or otherwise altering the state of such a source or of an intermediate input switching device such as an AV receiver may cause an observable effect on the 3D sync signal, and accordingly the above described set up steps may be applied mutatis mutandis to the selection of control codes for other appliances which form part of an exemplary interconnected entertainment system, which interconnection may be point-to-point, daisy chained, networked, etc. or a combination thereof and may further comprise wired or wireless technologies as appropriate.

Figure 6:
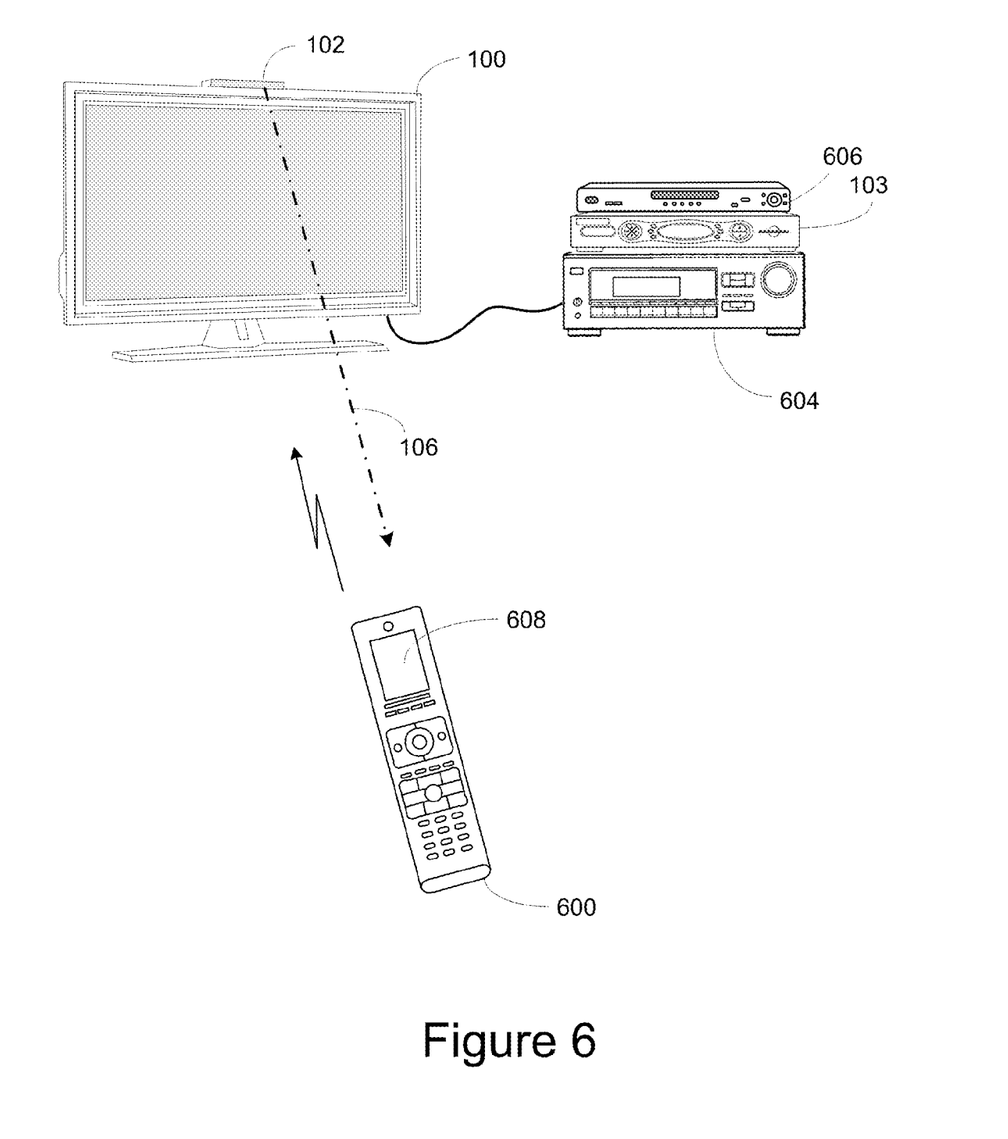
FIG. 6 illustrates an alternative system in which the method of FIG. 5 may be practiced.

It will be further appreciated that while presented in conjunction with a wearable 3D viewing apparatus, the appliance command code set selection techniques described above and illustrated in FIG. 5 may be equally advantageously applied to any controlling device capable of detecting the presence of a 3D sync signal, and as such the embodiment presented above is intended as exemplary only and not limiting. By way of further example, as illustrated in FIG. 6 a universal controlling device 600, for instance as described in co-pending U.S. patent application Ser. No. 12/569,121 "System and Method for Activity Based Configuration of an Entertainment System" of like assignee and incorporated herein by reference in its entirety, which controlling device is capable of detecting the presence of a 3D sync signal 106 via receiver means either provided specifically for that purpose or which are already provisioned for other purposes such as for example bi-directional communication with an AV receiver 604 or with STB 103, may utilize the method of FIG. 5 as a means for configuring controlling device 600 to command the operation of various appliances such as TV 100, STB 103, DVD player 606, etc.

In certain embodiments, the output 106 of 3D sync transmitter 102 may be further modulated in order to convey additional data to viewing devices 300,400; controlling device 600; or any other device capable of receiving such a signal. Such data may include without limitation device configuration information and/or settings, user messaging (e.g., to be displayed on an LCD screen 608 of a portable device), appliance status feedback (e.g., current volume level, channel number, etc.), caller ID information, program guide data, etc. Such modulation may take the form of simple on/off keying of the basic 3D sync signal or may comprise more elaborate encoding schemes superimposed upon, interleaved with, or substituted for the 3D sync transmissions.

In other embodiments, a wearable 3D viewing apparatus such as a headset or glasses may include earphones configured to receive an audio stream encoded either as part of the synchronization signal data, or as separate transmission. In this manner individual viewers may adjust volume levels to personal preference, listen to different language tracks, etc.

While various concepts have been described in detail, it will be appreciated by those skilled in the art that various modifications and alternatives to those concepts could be developed in light of the overall teachings of the disclosure. For example, while the illustrative example comprises the recognition and decoding of differing synchronization signal streams within a wearable portion of a universal viewing device, it will be appreciated that in other embodiments all or part of this processing may be performed within a separate device prior to transmission, i.e., in a universal version of adapter 102.

For example, it is contemplated that a device may be provided that functions to recognize various different forms of synchronization signals and which functions to convert received synchronization signals to a single generic synchronization signal that it to be used by a universal viewing device 300 or 400. It will be further appreciated that the methods herein, though illustrated in the context of a wireless synchronization signal, are equally applicable to a wired system.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A method for configuring a controlling device to control functional operations of an appliance, comprising:
    receiving a 3D sync signal transmitted to synchronize a wearable 3D viewing apparatus with a device adapted to render 3D media;
    using the received 3D sync signal to select from a library of command codes a command code set appropriate for controlling functional operations of the appliance; and
    causing the command codes within the command code set selected from the library of command codes to be assigned to respective keys of the controlling device whereupon a subsequent activation of one or more of the respective keys of the controlling device will cause the controlling device to issue a command transmission via use of one or more of the command codes within the command code set selected from the library of command codes to thereby control one or more functional operations of the appliance.

2. The method as recited in claim 1, wherein the 3D sync signal is transmitted by the appliance to be controlled.

3. The method as recited in claim 1, wherein the 3D sync signal is received by the controlling device.

4. The method as recited in claim 3, wherein the controlling device has a memory in which is stored the library of command codes.

5. The method as recited in claim 1, wherein the wearable 3D viewing apparatus comprises the controlling device.

6. The method as recited in claim 1, wherein the library of command codes is located external to the controlling device and comprising downloading the command code set selected from the library of command codes to the controlling device.

7. The method as recited in claim 1, wherein using the received 3D sync signal to select from a library of command codes the command code set appropriate for controlling functional operations of the appliance comprises causing the controlling device to repeatedly issue a command via use of a command code selected from one of plural command code sets within the library of command codes for the purpose of causing the appliance to perform a functional operation having an observable effect and selecting as the command code set appropriate for controlling functional operations of the appliance the one of the plural command code sets with the library of command codes having the command code that causes the appliance to perform the functional operation having the observable effect.

8. The method as recited in claim 7, wherein the observable effect comprises a suspension of transmission of the 3D sync signal.

9. The method as recited in claim 8, wherein a power command is transmitted by the controlling device to causes the suspension of transmission of the 3D sync signal.

10. The method as recited in claim 9, wherein the power command is intended to be received by the device adapted to render 3D media.

11. The method as recited in claim 9, wherein the power command is intended to be received by a device which outputs media to the device adapted to render 3D media.

12. The method as recited in claim 1, wherein the 3D sync signal comprises data representative of the appliance which is used to select from the library of command codes the command code set appropriate for controlling functional operations of the appliance.

13. The method as recited in claim 1, wherein the 3D sync signal comprises data representative of a state of an appliance in a network which includes the device adapted to render 3D media.

14. The method as recited in claim 13, wherein the state of the appliance comprises a volume level.

15. The method as recited in claim 1, wherein the 3D sync signal comprises data representative of a program guide for use in displaying a program guide on a display of the controlling device.

16. The method as recited in claim 1, wherein the 3D sync signal comprises data representative of a caller ID for use in displaying a caller ID on a display of the controlling device.

17. The method as recited in claim 1, wherein the 3D sync signal comprises data representative of a reproducible audio stream.

18. A system comprising:
    a first device having a 3D sync transmitter for transmitting a 3D sync signal for synchronizing a wearable 3D viewing apparatus with a rendering device adapted to render 3D media; and
    a second device having a receiver for receiving a signal transmitted by the 3D sync transmitter of the first device;
    wherein the second device includes programming for using a received 3D sync signal to select from a library of command codes a command code set appropriate for controlling functional operations of the appliance and for causing the command codes within the command code set selected from the library of command codes to be assigned to respective keys of the second device whereupon a subsequent activation of one or more of the respective keys of the second device will cause the second device to issue a command transmission via use of one or more of the command codes within the command code set selected from the library of command codes to thereby control one or more functional operations of at least the rendering device.

19. The system as recited in claim 18, wherein output of the 3D sync transmitter is further used to convey additional data to the second device.

20. The system as recited in claim 19, wherein the additional data is transmitted with the 3D sync signal.

21. The system as recited in claim 19, wherein the additional data is transmitted in a signal different than the 3D sync signal.

22. The system as recited in claim 19, wherein the additional data comprises data representative of a program guide for use in displaying a program guide on a display of the second device.

23. The system as recited in claim 19, wherein the additional data comprises data representative of a caller ID for use in displaying a caller ID on a display of the second device.

24. The system as recited in claim 19, wherein the additional data comprises data representative of an audio stream to be rendered via a speaker associated with the second device.

\* \* \* \* \*